United States Patent Office 3,754,035
Patented Aug. 21, 1973

3,754,035
TERTIARY ORGANOPHOSPHINES
Martin Grayson, Stamford, Conn., assignor to
American Cyanamid Company
No Drawing. Continuation-in-part of application Ser. No. 865,952, Oct. 13, 1969, which is a continuation of application Ser. No. 546,598, May 2, 1968, both now abandoned. This application Jan. 29, 1970, Ser. No. 6,952
Int. Cl. C07f 91/00, 91/02
U.S. Cl. 260—584 R
4 Claims

ABSTRACT OF THE DISCLOSURE

Unsymmetrical tertiary organophosphines selected from (A) compounds of the Formula I:

(I)

wherein Q is

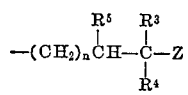

and Q' is

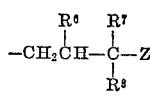

and Q" is Q, Q', alkyl, cycloalkyl, alkenyl, cycloalkenyl, cyanoalkyl, carboxyalkyl or carbamidoalkyl; and where Z is —OH or —NR$^1$R$^2$ where R$^1$ and R$^2$ independently are hydrogen or alkyl (C$_1$–C$_4$); R$^2$ may be acetyl, carbamyl or guanyl when R$^1$ is hydrogen; or R$^1$ together with R$^2$ and the nitrogen atom of —NR$^1$R$^2$ form a morpholinyl or piperidinyl ring; provided Z in Q and Q' are different; R$^3$ through R$^8$ independently are hydrogen or alkyl (C$_1$–C$_4$); and $n$ is 0–3; and (B) acid salts of said compounds such as the hydrochlorides. The compounds and salts are depilatory agents.

---

This application is a continuation-in-part of Ser. No. 865,952 filed Oct. 13, 1969, now abandoned, which in turn is a continuation of Ser. No. 546,598, May 2, 1968, now abandoned.

This invention concerns unsymmetrically substituted tertiary phosphine compounds and their use as depilatories.

The tertiary phosphines of the invention are selected from (A) compounds of the Formula I:

(I)

where Q is

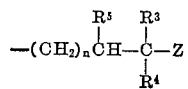

and Q' is

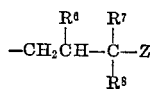

Q" is Q, Q', alkyl, cycloalkyl, alkenyl, cycloalkenyl, cyanoalkyl, carboxyalkyl or carbamidoalkyl; where Z is —OH or —NR$^1$R$^2$ where R$^1$ and R$^2$ independently are hydrogen or alkyl (C$_1$–C$_4$); or R$^2$ may be acetyl, carbamyl or guanyl when R$^1$ is hydrogen; or R$^1$ together with R$^2$ and the nitrogen atom of —NR$^1$R$^2$ form a morpholinyl or piperidinyl ring; provided Z in Q and Q' are different; R$^3$ through R$^8$ independently are hydrogen or alkyl (C$_1$–C$_4$); and $n$ is 0–3; and (B) acid salts of said compounds. In the definition of Q" the preferred carbon atom content is C$_1$–C$_8$ for alkyl and alkenyl, C$_3$–C$_6$ for cycloalkyl and cycloalkenyl, and C$_1$–C$_4$ in the remaining groups, except Q and Q'.

The tertiary phosphines depicted for Formula I above and the salts are prepared by known procedures. Typical of such procedures and of general applicability for preparation of the compounds of the invention is a two step synthesis in which (1) phosphine is reacted in a pressurized vessel with a terminally ethylenically unsaturated amine in the presence of a free radical initiator such as azoisobisbutyronitrile (AIBN) and the product (2) thereafter dissolved in a suitable solvent and reacted in an inert atmosphere with a terminally ethylenically unsaturated alcohol, again in the presence of a free radical initiator. Whether Q" in the product is the same as Q or Q' will in such case depend on the reactant ratios.

Alternatievly, the organophosphorus compounds of the invention may be prepared by first reacting the ethylenically unsaturated alcohol with phosphine, followed by reaction with the ethylenically unsaturated amine. Reactions such as the foregoing are described in J. Org. Chem. 26, 5138 (1961) and U.S. Pat. 2,803,597 to Stiles et al. For example, phosphine, generated by hydrolysis of aluminum phosphide, is alkylated with allyl alcohol in a benzene solution, in an autoclave, at temperatures of 75 to 80° C., with azoisobisbutyronitrile (AIBN) as a free radical initiator. At suitable reactant ratios, the primary and secondary 3-hydroxypropylphosphines are obtained in varying amounts. After separation by distillation, at reduced pressure, these phosphines may be converted into the tertiary compounds, for example by further reactions of the same type with other olefins.

Another process relates to the reaction or alkylation of a compound containing a P-H bond with a cyclic alkylating agent such as an olefin oxide, or a sultone:

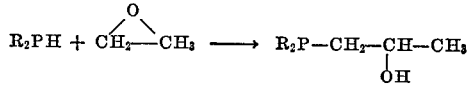

Still another process involves the reaction of a carbonyl compound such as an aldehyde, with a compound containing a P-H bond, for example:

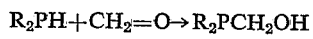

In some cases quaternary phosphonium salts are formed in the presence of acid catalysts, but the desired phosphine may be liberated by the action of bases. See J. Am. Chem. Soc. 85, 79 (1963), for example:

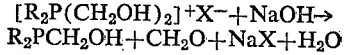

Substituted alkyl groups may be substituted on phosphorus by the base catalyzed (Michael) addition of certain activated olefins to P-H compounds, for example, the addition of acrylonitrile or acrylamide to provide carbamidoalkyl. See J. Am. Chem. Soc. 81, 1103 (1959). The nitrile group may be hydrolyzed by conventional techniques, such as with acid, water, and the like, to carboxylic acid or its salts, which in turn may be esterified to provide carboxyalkyl. Other activated olefins include acrylates and the like.

It will be obvious that one or both of the R groups in the reactions depicted above may represent —NR$^1$R$^2$ as defined above, except as evident to the organophosphorus chemist, in order to produce compounds of the invention.

Typical of the terminally ethylenically unsaturated amines useful in preparing compounds of Formula I are 3-amino-propene, 3-N-methylamino-propene, 3 - N,N - dimethylamino-propene, 3-N-ethylamino-propene, 3-N,N-diethylamino-propene, 3-N-isopropylamino-propene, 3-N-t-butylamino-propene, 3-N-methylamino-3-methyl-butene, 3-N-acetylamino-propene, 3-carbamyl-propene, N-allyl-morpholine, N-allylpiperidine, and the like.

Representative ethylenically unsaturated alcohols useful in preparing compounds of Formula I are 2-propene-1-ol, 3-buten-2-ol, 2-methyl-2-buten-1-ol, 2-methyl-3-buten-2-ol, 3-methyl-1-penten-3-ol, and the like.

The compounds of the invention wherein $R^2$ is guanyl are prepared by first forming a product as described above wherein $R^1$ and $R^2$ are each hydrogen and then reacting with O-methyl-pseudourea hydrochloride in water; for example ($m$ is 1–2):

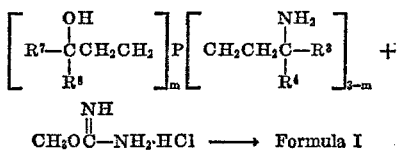

$$CH_3O\overset{NH}{\underset{\|}{C}}-NH_2 \cdot HCl \longrightarrow \text{Formula I}$$

The product guanyl compound exhibits depilatory activity as the acid salt or as the free base form, which is obtainable at a pH of about 13, since this compound exists as free base phosphine even as an acid salt. While others of the acid salts may be preferred from the standpoint of storage stability, they are readily converted to basic phosphines, to the degree required for depilatory activity, by raising the pH of their solutions. However, in some cases the amino group may be more basic than the phosphine structure and, although protonated to form the acid salt, the depilatory action due to the phosphine group remains.

Compounds of the invention also include (B) the acid addition salts thereof. Acids used to form the salts include both organic and inorganic acids. Typical of the former are the mono- and polycarboxylic acids and anhydrides such as formic, acetic, propanoic, succinic, maleic, phthalic, and the like. Representative of the latter are the mineral acids such as hydrochloric, hydrobromic, sulfuric, and the like.

The depilatory properties of the compounds of the invention are demonstrated by tests in which strands of hair are placed in contact with water or water-alcohol solutions of the compounds for specified periods of time and temperature. The reduction in tensile strength of the hair is a measure of the extent of disulfide bond cleavage of the hair keratin effected by the phosphine compounds. This property is useful in hair keratin deformation or depilation depending on the extent of reaction. It is the basis for cosmetic formulations designed for removal of hair or, in more controlled formulations in combination with a sequence of steps wherein the keratin disulfide bonds are reformed, in the cold waving of human hair. The compounds of the invention may therefore be employed singly or in admixture with each other and with other ingredients conventional to depilatory and cold wave compositions, including admixture with thioglycolates, a well known class of depilatories, and applied to the area on which depilatory action is desired, by swabbing, soaking, or like procedure. For depilatory uses a wide variety of cosmetically acceptable vehicles may be employed with the tertiary phosphines. Preferably, the compounds are applied in aqueous solution containing from about 0.05% to about 20% of the phosphine, but concentration can be adjusted as desired.

A significant feature of formula I above is the requirement that the compounds of the invention exhibit in their structure at least one amine moiety and at least one hydroxyl moiety wherein at least one of these moieties is separated from phosphorus by three carbon atoms, e.g., 3-aminopropyl or 3-hydroxypropyl. Based on model disulfide bond cleavage studies, and also on reduction in strength tests of hair strands, it has been found that structures of this type not only show improved water-solubility while retaining a high order of depilatory activity, but they also tend to be less irritating to mammalian skin. While all of the compounds of the invention do not possess this combination of properties to the same degree, they nevertheless provide levels of depilatory action, skin tolerance, and water solubility showing them to be unique among the virtually unlimited species of organophosphorus compounds.

The following examples are intended as further illustration of the invention but are not necessarily limitative.

EXAMPLE 1

(Part A)—$H_2PCH_2CH_2CH_2N(CH_2CH_3)_2$ 3-diethylaminopropylphosphine.—Benzene (600 ml.) and 12 g. azoisobisbutyronitrile was placed in a high pressure bomb. The bomb was charged with phosphine (395 g., 11.5 moles) and N,N-diethylallylamine (226.5 g., 2 moles). The bomb was then heated to about 65° C. and allowed to stand for about 48 hours. The bomb was thereafter vented and the contents subsequently distilled to yield the product in a mixture containing the secondary and tertiary phosphines as well. In a similar manner, the following phosphines were prepared:

$$H_2PCH_2CH_2CH_2NHCH_3$$

$$H_2PCH_2CH_2CH_2N(CH_3)_2, \quad H_2PCH_2CH_2CH_2NH_2,$$

$$H_2PCH_2CH_2CH_2NHCH_2CH_3$$

(Part B)—

$$(HOCH_2CH_2CH_2)_2PCH_2CH_2CH_2N(CH_2CH_3)_2$$

3 - diethylaminopropylbis(3 - hydroxypropyl)phosphine.—N,N-diethylaminopropylphosphine (17.8 g., 0.127 mole) from Part 1 above was dissolved in about 75 ml. benzene in a reaction flask and the solution placed in an inert atmosphere. Azoisobisbutyronitrile (1.67 g., 0.01 mole) was added to the solution, which was then heated in an oil bath to 60–65° C. Allyl alcohol (42 g., 0.72 mole) was added dropwise over a period of 20 minutes; some cooling was required to maintain the temperature below 65° C. The reaction mixture was then heated at 70–75° C. for 80 minutes. The benzene was stripped off and the residue distilled at 185–187° C. (0.3 mm. pressure).

EXAMPLES 2–6

Substantially as described in Example 1, the tertiary amines set forth in Table I below were prepared from the corresponding aminoalkylphosphines and alkenols.

TABLE I

| Example number | Phosphine product | Boiling point, °C./mm. | Theory | | | Found | | |
|---|---|---|---|---|---|---|---|---|
| | | | C | H | P | C | H | P |
| 2 | $(HOCH_2CH_2CH_2)_2PCH_2CH_2CH_2N(CH_2CH_3)_2$ | 185–187/.3 | 59.38 | 11.52 | 11.76 | 59.45 | 11.56 | 11.66 |
| 3 | $HOCH_2CH_2CH_2P[CH_2CH_2CH_2N(CH_3)_2]_2$ | 158–160/.3 | 59.50 | 11.91 | 11.81 | 59.88 | 11.85 | 11.16 |
| 4 | $(HOCH_2CH_2CH_2)_2PCH_2CH_2CH_2N(CH_3)_2$ | 178–180/.4 | 59.70 | 11.88 | 14.02 | 60.07 | 11.62 | 13.78 |
| 5 | $HOCH_2CH_2CH_2P(CH_2CH_2CH_2NHCH_3)_2$ | 156–160/.1 | 56.3 | 11.6 | 13.2 | 56.32 | 11.55 | 13.0 |
| 6 | $(HOCH_2CH_2CH_2)_2PCH_2CH_2CH_2NHCH_3$ | 168–170/.25 | 54.32 | 10.96 | 14.0 | 55.06 | 10.90 | 12.5 |

EXAMPLE 7

3 - guanidiniumpropylbis(3 - hydroxypropyl)phosphine hydrochloride.—3 - aminopropylbis(3 - hydroxypropyl) phosphine, 10 g. (0.048 mole), was dissolved in about 300 ml. deionized water; 5.3 g. (0.048 mole) methyl-pseudo-urea hydrochloride was then added. The solution was allowed to stand for several hours at room temperature to give the above identified product.

EXAMPLE 8

Compounds of the invention were tested for depilatory properties as follows, employing a tensile strength measuring device.

The diameters of several strands of brown European human hair were measured. The strands were then mounted vertically by attachment at the bottom to a movable platform and at top to a calibrated tensile strength dial, by means of an arm extending from the dial. The exposed length of hair was surrounded with the test solution in an appropriate vessel. The phosphine compound concentration in the test solution was 0.25 molar. The hair was allowed to remain in contact with the test solution for 5 minutes and the lower platform to which the hair strand was attached was then driven downward at a constant speed. The force required to break the strand could then be read from the dial and the tensile strength of the strand thereby calculated. These tensile strength values were then compared with the tensile strength of untreated hair, thereby permitting calculation of the efficiency of the test solutions in reducing the strength of the hair. This efficiency is called the Reduction in Strength (RIS) value of the test solution and is expressed as percent reduction in the test temperature (25° C. or 40° C.).

For RIS tests at 40° C., the hair strands were enclosed in heated jackets maintained at 40° C. The solution to be tested was heated to 40° C. and introduced into the jacket. Tensile strength to break and RIS were then determined as above.

Results are given in Table II below.

TABLE II

| Compound Example number: | Reduction in strength (percent) at— | |
| --- | --- | --- |
| | 25° C. | 40° C. |
| 2 | 94.7 | 100 |
| 3 | 92.8 | 100 |
| 4 | 94.6 | 100 |
| 5 | 93.0 | 100 |
| 6 | 95.2 | 100 |

EXAMPLE 9

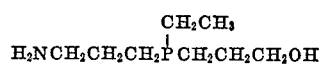

3 - aminopropyl - 3 - hydroxypropylethylphosphine.—3 - aminopropylphosphine (B.P. 58–64° C./54 mm.) is prepared in a high pressure reaction vessel by the free radical addition of allylamine to phosphine. The reaction is initiated by azoisobisbutyronitrile (AIBN). The primary phosphine is allowed to react further with allyl alcohol in benzene in the presence of AIBN to yield the secondary phosphine HOCH$_2$CH$_2$CH$_2$PHCH$_2$CH$_2$CH$_2$NH$_2$ (B.P. 116–122° C./0.18 mm.). The secondary phosphine is then reacted with ethylene in benzene in the presence of AIBN to yield to t-phosphine

HOCH$_2$CH$_2$CH$_2$P(CH$_2$CH$_3$)CH$_2$CH$_2$CH$_2$NH$_2$ (B.P. 124–127° C./0.15 mm.).

EXAMPLE 10

(HOCH$_2$CH$_2$CH$_2$)$_2$PCH$_2$CH$_2$NH$_2$

2 - aminoethylbis(3 - hydroxypropyl)phosphine.—Bis 3-hydroxypropylphosphine is reacted with ethylenimine in boiling anhydrous ethanol in the presence of a catalytic amount of hydrogen chloride to prepare the 2-aminoethyl derivative (above) which is then separated from by-products by distillation.

EXAMPLE 11

(C$_2$H$_5$)$_2$NCH$_2$CH$_2$CH$_2$P(CH$_2$CH$_2$OH)$_2$

3 - diethylaminopropylbis(2 - hydroxyethyl)phosphine.—The primary phosphine (C$_2$H$_5$)$_2$NCH$_2$CH$_2$CH$_2$PH$_2$ is prepared in a high pressure reaction vessel by a free radical addition to phosphine of the allylamine (C$_2$H$_5$)$_2$NCH$_2$CH=CH$_2$ The reaction is initiated by AIBN and carried out in benzene. The product is separated by distillation. The primary phosphine is then reacted with ethylene oxide (in excess) in the conventional manner to yield the tertiary phosphine depicted above.

EXAMPLE 12

(CH$_3$CH$_2$)$_2$NCH$_2$CH$_2$CH$_2$P(CH$_2$OH)$_2$

N,N' - Diethylaminopropylbis(hydroxymethyl)phosphine.—N,N'-diethylaminopropylphosphine (B.P. 96–98° C./25 mm.) is prepared in a high pressure reaction vessel by the free radical addition of diethylallyl amine to phosphine. The reaction is initiated by AIBN and carried out in benzene. The product is then separated by distillation and the primary phosphine reacted with formaldehyde in the presence of hydrogen chloride to give the hydrochloride salt of the tertiary phosphine (above).

EXAMPLE 13

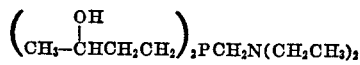

N,N' - diethylaminomethylbis(3 - hydroxybutyl)phosphine.—The secondary phosphine

(B.P. 116–121° C./0.3 mm.) is prepared in a high pressure reaction vessel by the free radical addition of 2-buten-1-ol to phosphine. The reaction is conducted in benzene solvent in the presence of a free radical initiator (AIBN). The secondary phosphine is isolated by distillation and then allowed to react with formaldehyde in the presence of diethylamine and hydrochloric acid to give the acid salt of the tertiary phosphine (above).

What is claimed is:
1. Tertiary phosphines selected from (A) compounds of the formula:

where Q is

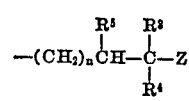

and Q' is

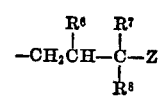

and Q" is Q, Q' or alkyl; and where Z is —OH or —NR¹R² where R¹ and R² independently are hydrogen or alkyl ($C_1$-$C_4$; provided Z is Q and Q' are different; $R^3$ through $R^8$ independently are hydrogen or alkyl ($C_1$-$C_4$); and $n$ is 0–3; and (B) acid salts of said compounds.

2. The compound 3-aminopropylbis-(3-hydroxypropyl)phosphine.

3. The compound 3-dimethylamino-propylbis(3-hydroxypropyl)phosphine.

4. The compound diethylaminopropylbis(3-hydroxypropyl)phosphine.

References Cited
UNITED STATES PATENTS

| 3,005,013 | 10/1961 | Grayson et al. | 260—583 EX |
| 3,035,053 | 5/1962 | Coates et al. | 260—583 EX |
| 3,037,978 | 6/1962 | Coates et al. | 260—583 EX |
| 3,320,321 | 5/1967 | Grayson et al. | 260—583 E |

LEWIS GOTTS, Primary Examiner

R. L. RAYMOND, Assistant Examiner

U.S. Cl. X.R.

260—247.5 R, 247.7 A, 294.7, 465.5 R, 534 M, 553 R, 561 R, 564 A, 563 R, 583 E; 424—200, 210, 211

Case No. 23,370

UNITED STATES PATENT OFFICE
CERTIFICATE OF CORRECTION

Patent No. 3,754,035          Dated August 21, 1973

Inventor(s) MARTIN GRAYSON

It is certified that error appears in the above-identified patent and that said Letters Patent are hereby corrected as shown below:

Column 2, line 36, the formula:

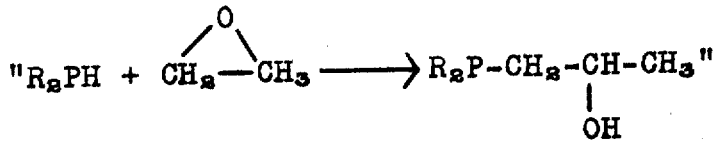

should read:

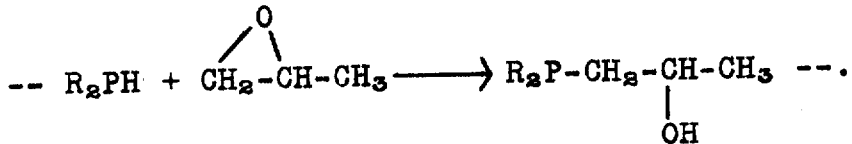

Column 4, line 51, "Part 1" should read -- Part A --.

Signed and sealed this 1st day of January 1974.

(SEAL)
Attest:

EDWARD M. FLETCHER, JR.
Attesting Officer

RENE D. TEGTMEYER
Acting Commissioner of Patents